United States Patent [19]
Oldham

[11] 4,032,439
[45] June 28, 1977

[54] EFFLUENT TREATMENT PROCESS

[75] Inventor: Guy Franklin Oldham, London, England

[73] Assignee: The British Petroleum Company Limited, London, England

[22] Filed: Mar. 18, 1976

[21] Appl. No.: 668,078

Related U.S. Application Data

[63] Continuation of Ser. No. 535,181, Dec. 23, 1974, abandoned.

[30] Foreign Application Priority Data

Jan. 3, 1974 United Kingdom ............. 00264/74

[52] U.S. Cl. .................................. 210/17; 210/80
[51] Int. Cl.² ........................................ C02C 5/10
[58] Field of Search ............. 210/17, 150, 81, 151, 210/80, 15, 11, 23, 40, 275, 82, 84, 32

[56] References Cited

UNITED STATES PATENTS

| | | | |
|---|---|---|---|
| 2,360,812 | 10/1944 | Kelly et al. ......................... | 210/17 |
| 3,152,983 | 10/1964 | Davis et al. ......................... | 210/11 |
| 3,574,329 | 4/1971 | Beavon ............................... | 210/80 |
| 3,617,539 | 11/1971 | Grutsch et al. ..................... | 210/82 |

*Primary Examiner*—Thomas G. Wyse
*Assistant Examiner*—Benoit Castel
*Attorney, Agent, or Firm*—Morgan, Finnegan, Pine, Foley & Lee

[57] ABSTRACT

A method for treating effluent water containing suspended oil from a gravity separator, which method comprises passing the effluent through a sand filter so as to remove suspended oil and produce water suitable for effective passage through a biological percolating filter; periodically stopping the flow of effluent water through the sand filter before suspended oil can pass; and backwashing the sand filter with water to remove suspended oil therefrom.

6 Claims, 1 Drawing Figure

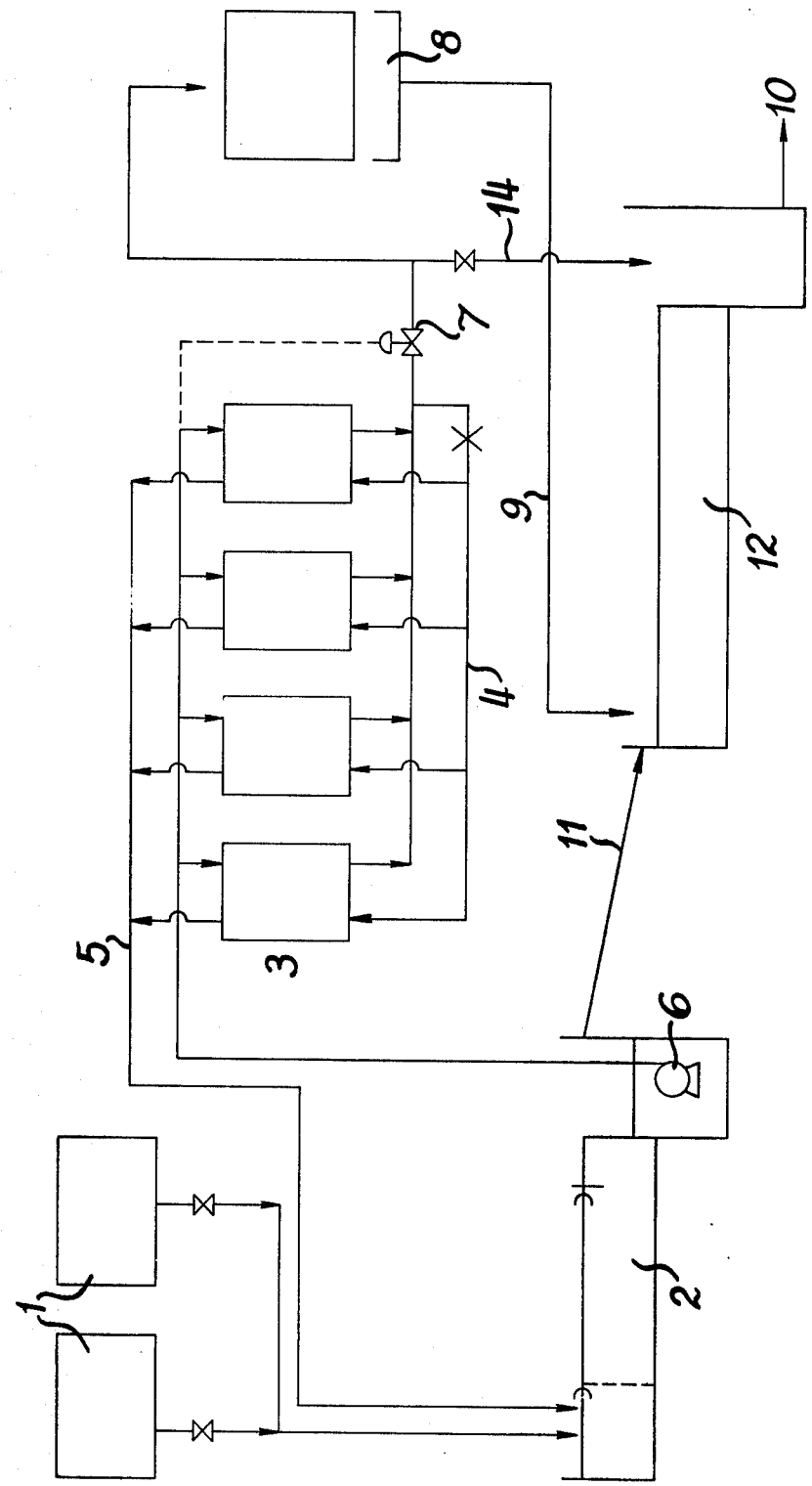

EFFLUENT TREATMENT PROCESS

This is a continuation, of application Ser. No. 535,181 filed Dec. 23, 1974, and now abandoned.

The invention relates to a method for treating effluent water contaminated with petroleum and petroleum products, particularly from oil refineries.

In operations in oil refineries water is used, e.g., as desalter water. After use in the refinery the effluent water is returned ultimately to a natural water source. The water becomes contaminated in the refinery and, before returning the effluent water to a wate source or disposing of it into a sewer the contaminating oil must be removed to comply with a particular standard.

Where it is required to have an effluent water containing less than about 5 ppm of oil a common method of treating the effluent water comprises passing the effluent water through a gravity separator to remove the bulk of the oil, and flocculating the residual oil, often in conjunction with biological treatment. The flocculation involves adding a hydrolysable metal salt, e.g., an aluminium or ferric salt to the water, and at the correct pH the hydroxide formed precipitates absorbing and carrying the oil with it. This results in an oily sludge requiring disposal which is normally destroyed by burning.

In refineries this oily sludge is usually burned in incinerators, which are expensive to install, operate and maintain. The incinerator cannot normally deal with salt-(sodium chloride) —containing sludge obtained when a salt-containing effluent is treated, the sodium content of the sludge causing damage to the incinerator lining.

As well as oil, refinery effluent water contains suspended soilds and other contaminants which take up oxygen when fed into natural waterways. The strength of these other contaminants is usually measured as the BOD (bilogical oxygen demand) of the effluent.

Biological treatment means are used to reduce the biological oxygen demand (BOD) of the effluent and are used to treat refinery effluent when the BOD of the untreated effluent is above an acceptable level.

It is known that biological treatment means function better under non-oily conditions and, in order to increase the efficiency of biological treatment means, refinery effluent frequently has its oil content lowered by flocculation during or before passing to a biological treatment means. The oil content of the liquid leaving the biological treatment means can also be reduced by undergoing a subsequent flocculation treatment to bring the oil content down to an acceptable level.

A commonly used biological treatment is the activated sludge process which has widespread usage in domestic sewage plants and in oil refineries, although its particular advantages are more apparent for treatment of aqueous wastes, with a high BOD, etc. However, activated sludge plants produce excess sludge which necessitates further disposal facilities such as incineration which is expensive to install and operate.

Another biological treatment for effluents is the percolating (trickling) filter, which has not been widely used owing to its unsuitability to deal very effectively with an oily effluent such as a refinery effluent.

Where there is no combined flocculation and activated sludge stage, the oil content of the liquid being passed to the biological treatment means needs to be reduced to a level which, after biological treatment, would be acceptable in a final outflow.

The type of effluent treatment system designed for a refinery will depend on the type and nature of the waste water and the required final concentration limits.

The final oil level and BOD to be achieved in the effluent from a refinery depends on the ultimate disposal of the effluent. If the effluent is discharged into a public domestic sewage system for treatment in a conventional sewage works then the allowable levels of oil and other contaminants is higher than where the refinery effluent can pass into a water source from which drinking water is drawn.

In order to achieve a low level of oil e.g. below 5 mg/litre and a low level of BOD it has hitherto been necessary normally to use a flocculation and separation of sludge either combined with or followed by activated sludge treatment, with the attendant production of much oily sludge requiring expensive disposal, usually by incineration.

We have found that a certain fraction of the oil in refinery waste water is rapidly oxidised during biological treatment but that the remainder is more slowly oxidised and appears mainly in the excess sludge which is normally produced.

While sand filtration of refinery effluents has been used to treat refinery effluents sand filters alone are not sufficient to achieve very low total oil concentrations because of soluble oils.

Sand filters do not remove soluble or emulsified oil but remove oily sludges, suspended solids and, under the correct conditions a large proportion of the insoluble oil.

We have now found surprisingly that the fractions of oil removed or not removed by biological percolation filtration and sand filtration are largely complementary, each treatment being able to remove a large proportion of the fraction of oil not removed by the other method.

We have now devised a method for treating refinery effluent which enables an oil content of below 5 mg/litre to be achieved without a flocculation stage, which avoids the need for an incinerator and which can be used on almost all refinery and similar effluents. According to the invention there is provided a method for treating effluent water containing oil, which method comprises passing the effluent water firstly through a sand filter and subsequently through a biological percolating filter.

Reversal of the order of the stages is not a satisfactory or as effective.

We have found that surprisingly biological percoating percolating treatment after sand filtration can be adequate to achieve the required oil and BOD levels and, contrary to what would be expected, is superior in some respects to an activated sludge treatment, for example, in our method surprisingly little humus sludge is produced compared with the excess sludge from an activated sludge. Biological percolating filters have been found to have advantages over activated sludge plants such as a greater resistance to shock loads especially alkali because of the neutralising action of the high $CO_2$ concentrations towards the top of the filter bed, good oxidation of ammonia in the lower levels and temperature reduction of warm effluents.

The term biological percolating filter includes submerged and partly submerged biological percolating filters.

In place of biological percolating filter a plurality of biological percolating filters in series or parallel can be used.

This system is particularly applicable to effluent from a refinery gravity separator such as any form of parallel plate separator or settlement tank etc. or an API separator as described in "Manual on Disposal of Refinery Wastes" 1969 published by the American Petroleum Institute or equivalent.

The term sand is used to include all granular media.

Sand filters used in the present invention preferably have a sand particle mesh size of preferably 0.5 mm to 5 mm, e.g. about 1 mm.

The dimensions of the sand filters and particle size depend on the flow rate the nature of the waste water and required final effluent quality. In place of one sand filter, a plurality of sand filters in parallel can be used.

In order to regenerate a sand filter it can be back-washed using combinations of air and/or warm water, and the oily water produced, which can contain as much as 1-26wt. of oil is preferably passed back to the gravity separator. It is very surprising that with this recirculation a satisfactory equilibrium is attained which enables the method to be used without the oil content of the output from the sand filters rising to an unacceptable level.

In the present invention and with back circulation all the oil separated by the sand filters is ultimately recovered from the gravity separator as usable oil, and there are no new oily by products which would otherwise require disposal e.g. by incineration.

In a preferred embodiment of the invention a single pumping stage is used to pump the oil contaminated water leaving the gravity separator, through the sand filters and to the top of a biological percolating filter. The static head of liquid between the sand filters and the percolating filter helps to maintain a constant back-pressure on the pumps and facilitates the control of the liquid flow out of the sand filters. The control of the liquid flow out of the sand filters is normally accomplished by an automatically adjustable back-pressure control valve, such control being required for correct operation of the pumps.

After conventional biological percolating filters, there is a settling tank designed for the settling and removal of the humus sludge formed.

We have surprisingly found that, with the use of sand filters, after passing the effluent through the percolating filter, removal of humus sludge is not required, the suspended solids content of treated liquid passing out of the biological percolating filter means being sufficiently low to permit direct discharge.

Biological percolating filters are described in L. Klein; River Pollution, 3: Control, London, Butterworth 1966 p.101.

The relative size of the sand filters and biological percolating filter is adjusted according to the flowrate and the composition of the refinery or other oily waste water, and the quality of the effluent to be achieved.

Although both sand filters and biological treatment stages have been independently used to treat refinery effluents it is very surprising that the use of sand filters followed by a biological percolating filtration treatment enables a low level of oil, and BOD to be achieved with a suspended solid content so low that it is not necessary to separate the small quantities of humus sludge present.

Where large volumes of rain water or other run off water can pass through the system then a storage basin or cavity can be incorporated in the system to temporarily hold the excess water, e.g. preferably in the form of a combined storm and water basin/ pump sump for the sand filters.

The invention will now be described with reference to the accompanying drawing which is a schematic representation of one example of the process of the present invention and in which sources of oily waste water holding tanks 1 are connected to an API separator 2 to remove oily sludge. The water from the API separator is pumped by a battery of pumps 6 to a bank of parallel sand filters 3. Connected to the sand filters 3 is a back wash main 4 which can back wash the sand filters individually and sequentially and the back wash water is led via conduit 5 to the API separator. The water passing through the sand filter is passed through pressure control valve 7 to a biological percolating filter 8. Water from the biological percolating filter 8 is passed via conduit 9 to a lagoon or equilibrium basin 12 from where it can be finally discharged via outlet 10.

There is an emergency gravity overflow 11 connecting the API separator 2 to the lagoon or equilibrium basin 12, and an emergency by-pass 14 to enable the water from the sand filters 3 to by-pass the percolating filter 8, in the event of spillage of a toxic material such as mineral acid.

In operation waste water from 1 is passed to the API separator 2 where most of the oil is removed, after leaving the API separator 2 the water is pumped through the sand filters 3, where the unsettleable suspended oil is removed. After leaving the sand filters 3 the water then passes to the percolating filter 8, the back pressure at the pumps being controlled by pressure control valve 7. In the biological percolating filter 8 the soluble oil and BOD level are reduced to the required limits, and the treated water is then passed to the equilibrium basin 12 before final discharge.

When the sand filters 3 are due for back washing they are back washed with water and air and the back wash oil etc. is led via conduit 5 to API separator 2.

An example of the invention is given below

EXAMPLE

A sand filter of sand particle mesh size 1 to 2 mm and a maximum rated flow rate of 460 cubic metres per hour was connected to a biological percolating filter containing a random fill 2 inch plastic medium.

A refinery effluent after leaving an API separator of oil content 22 mg/litre (measured by chloroform extraction, evaporation at room temperature and weighing) and a $BOD_5$ content of 100 mg/litre was passed through the sand filter and then through the biological percolating filter at a rate of 80 cubic metres per hour. After coming from the biological percolating filter the final effluent had an oil content of 4 mg/litre and a $BOD_5$ content of 10 mg/litre.

I claim:

1. A method for treating effluent water contaminated with petroleum and petroleum products containing oil and suspended solids to produce a clarified effluent water having a level of oil below about 5 mg/litre and a low level of BOD comprising the following sequential steps:

a. passing said contaminated effluent water to a gravity separator where insoluble oil and solids are separated from the aqueous phase;

b. passing the resulting oil and solids depleted aqueous phase effluent through a sand filter to remove unseparated insoluble oil and solids from the aqueous phase effluent and to obtain a resulting aqueous effluent suitable for effective passage through a biological percolating filter;

c. passing said resulting aqueous effluent through a biological percolating filter to reduce the BOD thereof to the desired low level thereby obtaining said clarified effluent water;

d. periodically stopping the flow of the aqueous phase effluent through the sand filter before insoluble oil passes therethrough and backwashing the sand filter to remove suspended oil therefrom.

2. A method as claimed in claim 1 in which the sand filter has an average particle mesh size of 0.5mm to 5mm.

3. A method as claimed in claim 1 in which a single pumping stage is used to pump the aqueous phase effluent through the sand filter to the top of the biological percolating filter.

4. A method as claimed in claim 1 in which the aqueous phase effluent is passed through a plurality of sand filters in parallel before passing to the biological percolating filter to allow for sequential backwashing of the filters.

5. A method as claimed in claim 1 in which the sand filter is backwashed with a mixture of water and air.

6. A method as claimed in claim 5 in which the backwash water is passed to an oil refinery gravity separator.

* * * * *

UNITED STATES PATENT AND TRADEMARK OFFICE
CERTIFICATE OF CORRECTION

PATENT NO. : 4,032,439
DATED : June 28, 1977
INVENTOR(S) : Guy Franklin Oldham

It is certified that error appears in the above-identified patent and that said Letters Patent are hereby corrected as shown below:

Col. 2, lines 50-51, should read:

--We have found that surprisingly biological percolating filtration treatment after sand filtration can be--

Signed and Sealed this

Twenty-seventh Day of September 1977

[SEAL]

Attest:

RUTH C. MASON
Attesting Officer

LUTRELLE F. PARKER
Acting Commissioner of Patents and Trademarks